UNITED STATES PATENT OFFICE.

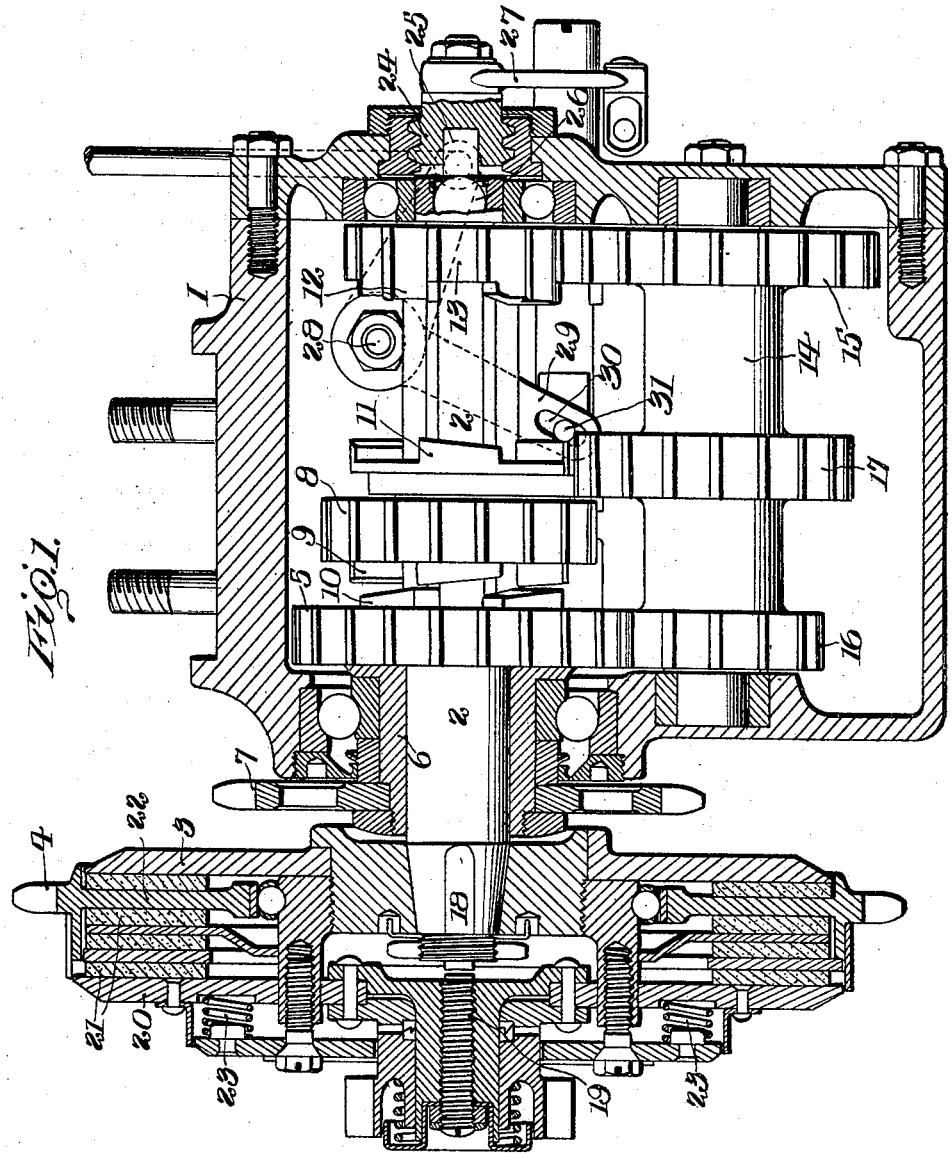

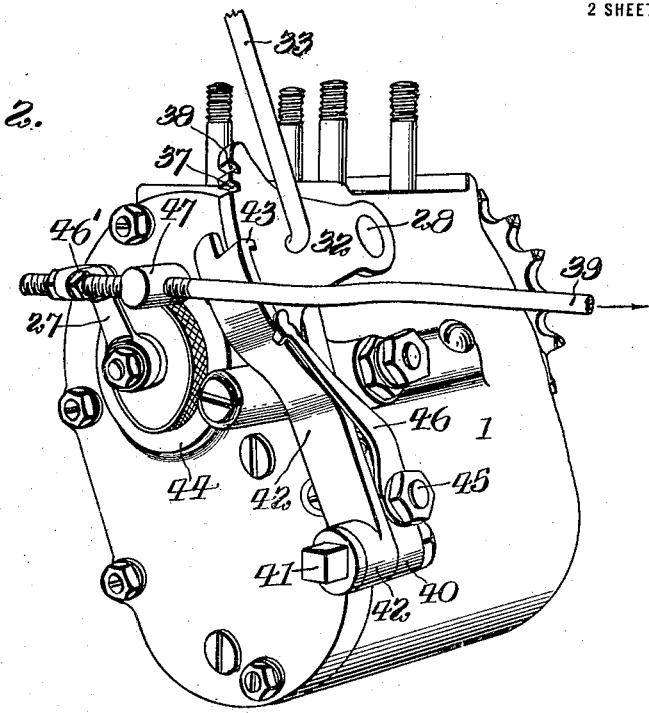
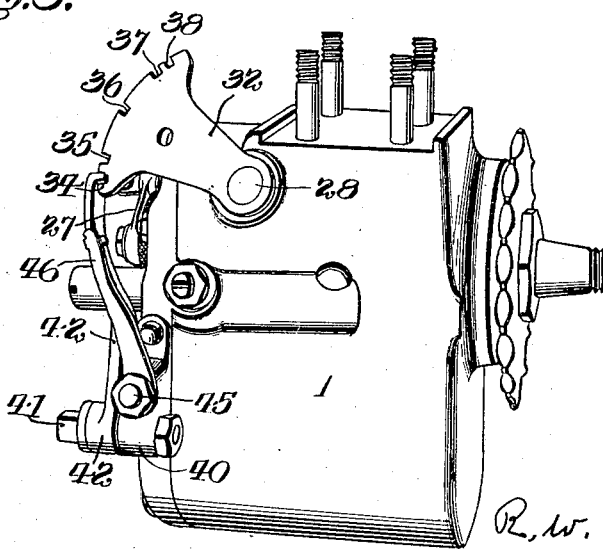

ROBERT W. ELLINGHAM, OF SPRINGFIELD, MASSACHUSETTS, ASSIGNOR TO HENDEE MANUFACTURING COMPANY, OF SPRINGFIELD, MASSACHUSETTS, A CORPORATION OF MASSACHUSETTS.

SAFETY-LOCK FOR GEAR-SHIFT LEVERS.

1,326,041. Specification of Letters Patent. Patented Dec. 23, 1919.

Application filed December 26, 1914. Serial No. 879,136.

*To all whom it may concern:*

Be it known that I, ROBERT W. ELLINGHAM, a citizen of the United States, residing at Springfield, in the county of Hampden, State of Massachusetts, have invented certain new and useful Improvements in Safety-Locks for Gear-Shift Levers, of which the following is a description, reference being had to the accompanying drawing and to the figures of reference marked thereon.

My invention relates to new and useful improvements in safety locks for gear shift levers.

The object of my invention is to provide a lock of this character which will prevent the gear shift lever from throwing the gears from one speed to another while the clutch is engaged and thus greatly relieves the gears of the strain to which they are usually subjected and prevents injury thereto.

Another object of my invention is to provide a device of this character, in which the gear shift lever is automatically and positively locked at either high, low, intermediate or at neutral and can not be operated to shift the gears while the clutch is engaged.

A further object of my invention is to provide a lock of this character having certain specific construction and arrangement of parts hereinafter set forth.

In the drawings:—

Figure 1 is a vertical sectional view of a sliding gear, transmission and clutch, showing the gear shift lever to which my invention is to be applied;

Fig. 2 is a perspective view of the gear casing looking from the opposite end from that carrying the clutch and showing the clutch removed; and Fig. 3 is a perspective view similar to Fig. 2, looking from the opposite end of the gear casing.

Referring now to the drawings, 1 represents the gear casing of my improved sliding transmission and has rotatably mounted therein the shaft 2 which extends beyond the end of the casing. The end of the shaft 2 has rigidly mounted thereon the clutch 3, which is adapted to rotate with the shaft and power is transmitted from the clutch to the gears in the casing. The sprocket wheel 4 is driven by a chain from the engine and by the friction clutch drives the shaft 2. Loosely mounted on the shaft 2 and adjacent the end of the casing is a gearing 5, with its hub 6 extending outwardly beyond the casing and rigidly secured thereon is the sprocket 7, over which passes the chain which passes rearwardly over the sprocket carried by the rear hub of the vehicle and by means of which it is driven. The gear 5 is at all times the driving gear for the sprocket 7, as will be later described.

Slidably mounted upon the shaft 2, beyond the gear 5 is a second gear 8, which is adapted to at all times rotate with the shaft 2, yet is free to move longitudinally thereon. One face of the said gear is provided with beveled lugs 9 which are adapted to interlock with the beveled lugs 10 carried by the gear 5 and by which the rotary motion of the shaft 2 is directly imparted to the gear 5, and is the high speed. The opposite face of the gear 8 is provided with beveled lugs 11, adapted to engage the beveled lugs 12 of the gear 13 and by which the gears 8 and 13 are locked together. This gear 13 is rotatably mounted upon the shaft 2 and is held against longitudinal movement on the said shaft. Mounted within the lower end of the casing 1 is a shaft 14, having a gear 15 keyed at one end, which at all times meshes with the gear 13. The opposite end of the shaft 14 is provided with a gear 16, which at all times meshes with the gear 5 and is keyed upon the shaft 14. Located midway between the gears 15 and 16 and keyed on the shaft 14 is a gear 17 which is adapted to mesh with the gear 8 and represents the intermediate speed. Longitudinally passing through the shaft 2 is a pin 18, which is adapted to engage the member 19 for forcing the member 20 outwardly and thus allows the friction disks 21 to disengage the annular portion 22 of the sprocket 4. The friction disks 21 are normally held in engagement with the annular portion 22 of the sprocket 4 by means of the strong coil springs 23. The pin 18 is longitudinally moved through the shaft 2 by means of the worm 24. This worm has a plug 25 which engages a ball 26, which bears against the pin 18, and by operating the worm 24 to the right, it will be seen that the engagement of the ball 26 with the pin 18 forces the same into engagement with the member 19 and forces the member 20 outwardly and thus relieves the pressure of the friction disks on the sprocket 4 and allows the same to rotate independently of the clutch 3.

The shaft 2 being continuously rotated, it will be seen that when the gear 8 is moved into central position, it will engage the gear 17 and drive the same, and, through the medium of the gear 16, drives the gear 5, which carries the sprocket 7, whereby the sprocket 7 is driven. This represents the intermediate speed. When the gear 8 is moved so that the lugs 11 engage the lugs 12 of the gear 13, the said gear 13 drives the gear 15, and, through the medium of the shaft 14 and the gear 16 carried thereby, the gear 5 is driven which carries the sprocket 7 and thereby drives the sprocket. This is the low speed.

The worm 24 carries a lever 27, by means of which the clutch is thrown into or out of engagement for releasing the sprocket 4.

Extending into the casing 1 is an oscillating shaft 28 carrying an arm 29 having an elongated slot 30 at its lower end through which extends a pin 31 carried by the extension on the gear 8. The extension carrying the pin 31 is loosely supported by the gear 8 so that the gear can rotate independent of the same. By the oscillation of this shaft 28, it will be seen that the gear 8 is either locked directly to the gear 5 for the high speed; or brought into a position meshing with the gear 17 for the intermediate speed; or into the position where it is locked with the gear 13 for low speed. The shaft 28, on the outside of the casing, has keyed thereon an oscillatable sector or gear shift lever 32 to which is connected a rod 33, and whereby the gears are shifted, as heretofore described. The outer edge of the sector or lever 32 is arranged in the arc of a circle, and is provided with notches 34, 35, 36, 37 and 38. These notches represent the high, intermediate and low speeds and the points intermediate the notches thus represented are to indicate the neutral points either between high and intermediate or between intermediate and low, as will be later described.

The arm 27 is provided with a rod 39 which extends to a point in easy reach of the operator and by means of which the clutch can be thrown into or out of engagement, as in the manner heretofore described. In order to hold the fan shaped member 32 against movement, I have provided the casing 1 with an outwardly extending ear 40, carrying a bolt 41 and upon which is pivotally mounted the arm 42. This arm extends upwardly and is curved to correspond with the curved outer edge of the sector or lever 32. The upper end of the arm 42 is cut away and turned inwardly at 43 and is adapted to enter the notches in the edge of the sector or lever. The downward movement of the arm 42 is limited by the bushing 44 carried by the end of the casing. In order to hold the said arm in the position shown in Fig. 2, I have provided the ear 40 with a bolt 45, upon which is mounted a leaf spring 46, which has its outer end bearing against the upper edge of the arm 42.

The clutch operating rod 39, intermediate the arm 42 and its connection 46' with the lever 27 is provided with a circular nut 47, which is adapted to engage the lower edge of the arm 42 and force it outwardly to bring the turned end 43 out of the notches of the sector or lever 32, so that the gear shift lever is free to be operated. This nut 47, as shown in Fig. 2 of the drawings, is screw threaded on the rod 39 and can be adjusted for releasing the arm 42 at the proper time.

From the foregoing description, it will be seen that when the clutch is engaged the rod 39 is in the position shown in Fig. 2 of the drawings, and when the said rod is moved in the direction of the arrow, Fig. 2, the nut 47 engages the underface of the arm 42 and throws the member 43 out of the notches in the sector or lever 32 and allows the gear shift lever 33 to operate the sliding gear 8 and causes it to engage the proper gear for either high, intermediate or low speed. When the proper speed is reached, the member 43 drops, by means of the spring 46, into another notch and the gear shift lever is again locked and cannot be operated until the clutch rod is again drawn outwardly in the direction of the arrow, Fig. 2. The notch 34 indicates low; the notch 36 intermediate and the notch 38 high speed. The notch 35 indicates neutral between high and intermediate and the notch 37 indicates neutral between intermediate and low speed.

Having thus described my invention, what I claim as new and desire to secure by Letters Patent, is:

1. In a device of the character described, the combination of a sliding gear, means to shift said gear including an oscillatable notched sector, a shiftable clutch, mechanism to shift said clutch including an arm oscillatable in a plane at right angles to the plane of movement of the notched sector, locking means for said gear shifting means oscillatable in a plane parallel to the plane of movement of said clutch shifting arm and normally adapted to engage a notch in said sector, and means operated by the oscillation of said clutch shifting arm for disengaging said locking means from said notched sector whereby said gear may be shifted when the clutch is shifted.

2. In a device of the character described, the combination of a sliding gear, means to shift said gear including an oscillatable sector, a shiftable clutch, mechanism to shift said clutch including an arm oscillatable in a plane at right angles to the plane of movement of the sector, locking means for said gear shifting means normally adapted to engage said sector, and means operated by the oscillation of said clutch shifting arm for disengaging said locking means from said sector whereby said gear may be shifted when the clutch is shifted.

3. In a device of the character described, the combination with a transmission, a gear shift lever for said transmission, a pivoted spring pressed lock adapted to engage the gear shift lever and lock it, a clutch, a clutch rod, a projection carried by the clutch rod and adapted to engage the lock for releasing the gear shift lever when the clutch is thrown out of operation.

4. In a device of the character described, the combination with a transmission, a gear shift lever for said transmission having notches in its outer periphery, a pivoted spring pressed lock adapted to enter the notches in the gear shift lever, a clutch, a clutch rod, and a projection carried by the clutch rod adapted to engage the lock for throwing it out of the notches in the gear shift lever when the clutch is thrown out of operation.

5. In a device of the character described, the combination with a sliding transmission, a gear shift shaft, a fan-shaped arm carried by the shaft and having a curved outer edge provided with notches adapted to represent the three speeds and the two neutral points between the speeds, means for operating said arm, a lock pivoted at right angles to the gear shift shaft and having a laterally turned portion adapted to enter the notches in the curved edge of the arm and normally spring held in such a position, a clutch, a clutch lever, a rod connected to the clutch lever, and an adjustable nut on said lever adapted to engage the edge of the lock for oscillating it upon its pivot against the spring to throw the laterally turned portion out of the notches in the gear shift arm when the clutch rod is moved to throw the clutch out of operation.

6. In a device of the character described, the combination with a transmission, a gear shift lever for said transmission, a pivoted spring-pressed lock adapted to engage the gear shift lever and lock it, a clutch, a clutch rod, and an adjustable projection on the clutch rod and adapted to engage the lock for releasing the gear shift lever when the clutch is thrown out of operation.

In testimony whereof, I affix my signature, in the presence of two witnesses.

ROBERT W. ELLINGHAM.

Witnesses:
 JOHN D. STEPHENS,
 JOHN T. CRONIN.